United States Patent
Bowers et al.

(10) Patent No.: US 10,889,365 B2
(45) Date of Patent: Jan. 12, 2021

(54) AUXILIARY SUPPORT SYSTEM FOR A FLAP OF AN AIRCRAFT WING

(71) Applicant: The Boeing Company, Chicago, IL (US)

(72) Inventors: Bret A. Bowers, Langley, WA (US); Mirela Isic, Seattle, WA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 15/922,626

(22) Filed: Mar. 15, 2018

(65) Prior Publication Data

US 2019/0283863 A1    Sep. 19, 2019

(51) Int. Cl.
| | |
|---|---|
| *B64C 9/02* | (2006.01) |
| *B64C 9/16* | (2006.01) |
| *B64C 9/14* | (2006.01) |
| *B64C 13/30* | (2006.01) |
| *B64C 9/22* | (2006.01) |

(52) U.S. Cl.
CPC .............. *B64C 9/02* (2013.01); *B64C 9/14* (2013.01); *B64C 9/16* (2013.01); *B64C 9/22* (2013.01); *B64C 13/30* (2013.01)

(58) Field of Classification Search
CPC .... B64C 9/02; B64C 9/16; B64C 9/18; B64C 9/20; B64C 9/22; B64C 9/24; B64C 9/26; B64C 9/28
See application file for complete search history.

(56) References Cited

U.S. PATENT DOCUMENTS

| | | | | |
|---|---|---|---|---|
| 2,938,680 A | * | 5/1960 | Greene | ...................... B64C 9/24 244/214 |
| 3,940,093 A | * | 2/1976 | Cabriere | .................... B64C 9/24 244/203 |
| 6,382,566 B1 | | 5/2002 | Ferrel et al. | |
| 8,763,953 B2 | | 7/2014 | Sakurai et al. | |

(Continued)

FOREIGN PATENT DOCUMENTS

| | | |
|---|---|---|
| EP | 0100775 B1 | 1/1987 |
| EP | 2851285 | 3/2015 |
| WO | 2014209714 | 12/2014 |

OTHER PUBLICATIONS

Aviation Stack Exchange, "How do flap track guides work?", https://aviation.stackexchange.com/questions/23824/how-do-flap-track-guides-work, accessed Mar. 15, 2018.

(Continued)

*Primary Examiner* — Nicholas McFall
*Assistant Examiner* — Terri L Filosi
(74) *Attorney, Agent, or Firm* — Kunzler Bean & Adamson

(57) ABSTRACT

Described herein is an auxiliary support system for a flap coupled to a wing of an aircraft. The auxiliary support system comprises a base fixable relative to the wing. The auxiliary support system also comprises a first track engagement assembly fixed to the base. The auxiliary support system further comprises a second track engagement assembly fixed to the base. The auxiliary support system additionally comprises a track arm attachable to the flap and comprising a first rail, movably engaged with the first track engagement assembly, and a second rail, movably engaged with the second track engagement assembly. The first rail is spaced apart from and non-parallel to the second rail.

20 Claims, 7 Drawing Sheets

(56) References Cited

U.S. PATENT DOCUMENTS

| | | | |
|---|---|---|---|
| 2007/0102587 A1* | 5/2007 | Jones | B64C 9/22 244/214 |
| 2009/0127402 A1* | 5/2009 | Jaggard | B64C 9/02 244/213 |
| 2019/0233081 A1* | 8/2019 | Budnitsky | B64C 9/02 |

OTHER PUBLICATIONS

Extended European Search Report for European Patent Application No. 19156866.6 dated Jul. 15, 2019.

* cited by examiner

AUXILIARY SUPPORT SYSTEM FOR A FLAP OF AN AIRCRAFT WING

FIELD

This disclosure relates generally to flaps of an aircraft, and more particularly to supporting flaps of an aircraft at auxiliary locations on the flaps.

BACKGROUND

The flaps of aircraft wings are used to regulate the lift generated by the wings. For example, flaps are extended to increase drag and lift during take-off and landing and retracted at cruising speeds. Flaps are extended and retracted along a set path of motion. However, flaps can be susceptible to bending or deflection under the loads experienced during flight, which may cause the flaps to move along a path different than the set path. Maintaining motion of flaps along the set path, particularly at locations along the flaps that are more susceptible to bending or deflection is difficult without obstructing a loft profile of the wing.

SUMMARY

The subject matter of the present application has been developed in response to the present state of the art, and in particular, in response to the shortcomings of systems for supporting and actuation flaps of aircraft wings that have not yet been fully solved by currently available techniques. Accordingly, the subject matter of the present application has been developed to provide an auxiliary support system and a flap actuation assembly that overcome at least some of the above-discussed shortcomings of prior art techniques.

Described herein is an auxiliary support system for a flap coupled to a wing of an aircraft. The auxiliary support system comprises a base fixable relative to the wing. The auxiliary support system also comprises a first track engagement assembly fixed to the base. The auxiliary support system further comprises a second track engagement assembly fixed to the base. The auxiliary support system additionally comprises a track arm attachable to the flap and comprising a first rail, movably engaged with the first track engagement assembly, and a second rail, movably engaged with the second track engagement assembly. The first rail is spaced apart from and non-parallel to the second rail. The preceding subject matter of this paragraph characterizes example 1 of the present disclosure.

The first rail and the second rail are non-linear. The preceding subject matter of this paragraph characterizes example 2 of the present disclosure, wherein example 2 also includes the subject matter according to example 1, above.

The track arm comprises a free end portion and a fixed end portion. The free end portion is opposite the fixed end portion. The fixed end portion is attachable to the flap. The first rail and the second rail diverge away from the fixed end portion. The preceding subject matter of this paragraph characterizes example 3 of the present disclosure, wherein example 3 also includes the subject matter according to any one of examples 1 or 2, above.

The first rail of the track arm is slidably engaged with the first track engagement assembly. The second rail of the track arm is slidably engaged with the second track engagement assembly. Slidable engagement between the first rail and the first track engagement assembly and between the second rail and the second track engagement assembly keeps the fixed end portion of the track arm within an extension path comprising a linear portion and a curved portion. The preceding subject matter of this paragraph characterizes example 4 of the present disclosure, wherein example 4 also includes the subject matter according to example 3, above.

The track arm comprises a free end portion and a fixed end portion. The track arm comprises a free end portion and a fixed end portion. The fixed end portion is attachable to the flap. A distance between the first rail and the second rail is greater at the free end portion than at the fixed end portion. The preceding subject matter of this paragraph characterizes example 5 of the present disclosure, wherein example 5 also includes the subject matter according to any one of examples 1-4, above.

Each of the first rail and the second rail has a substantially S-shape. The preceding subject matter of this paragraph characterizes example 6 of the present disclosure, wherein example 6 also includes the subject matter according to any one of examples 1-5, above.

The track arm comprises a free end portion and a fixed end portion. The free end portion is opposite the fixed end portion. The fixed end portion is attachable to the flap. The fixed end portion of the track arm comprises a spherical bearing. The track arm is attachable to the flap via the spherical bearing. The preceding subject matter of this paragraph characterizes example 7 of the present disclosure, wherein example 7 also includes the subject matter according to any one of examples 1-6, above.

The first track engagement assembly is horizontally and vertically offset from the second track engagement assembly. The preceding subject matter of this paragraph characterizes example 8 of the present disclosure, wherein example 8 also includes the subject matter according to any one of examples 1-7, above.

Each of the first track engagement assembly and the second track engagement assembly comprises a first roller and a second roller. The first rail of the track arm is interposed between the first roller and the second roller of the first track engagement assembly. The first roller and the second roller of the first track engagement assembly are rollable along the first rail. The second rail of the track arm is interposed between the first roller and the second roller of the second track engagement assembly. The first roller and the second roller of the second track engagement assembly are rollable along the second rail. The preceding subject matter of this paragraph characterizes example 9 of the present disclosure, wherein example 9 also includes the subject matter according to any one of examples 1-8, above.

The base comprises two plates spaced apart from each other. The track arm is interposed and movable between the two plates. The preceding subject matter of this paragraph characterizes example 10 of the present disclosure, wherein example 10 also includes the subject matter according to any one of examples 1-9, above.

The auxiliary support system further comprises at least one rub pad interposed between one of the two plates and the track arm and at least one rub pad interposed between the other of the two plates and the track arm. The preceding subject matter of this paragraph characterizes example 11 of the present disclosure, wherein example 11 also includes the subject matter according to example 10, above.

Further described herein is an aircraft. The aircraft comprises a body. The aircraft also comprises a wing coupled to and extending from the body. The wing comprises an outer upper surface and an outer lower surface, the outer upper surface and the outer lower surface defining a loft profile of the wing. The aircraft further comprises a flap coupled to the wing and extendable from the wing along an extension path comprising a linear portion and a curved portion. The aircraft additionally comprises an auxiliary support system. The auxiliary support system comprises a base fixed to the wing within the loft profile of the wing, a first track engagement assembly fixed to the base, a second track engagement assembly fixed to the base, and a track arm attached to the flap. The track arm comprises a first rail, movably engaged with the first track engagement assembly, and a second rail, movably engaged with the second track engagement assembly. The track arm moves along the extension path with the flap and remains within the loft profile of the wing as the flap extends from the wing. The preceding subject matter of this paragraph characterizes example 12 of the present disclosure.

The first rail is spaced apart from and non-parallel to the second rail. The preceding subject matter of this paragraph characterizes example 13 of the present disclosure, wherein example 13 also includes the subject matter according to example 12, above.

The wing is fairingless at the auxiliary support system. The preceding subject matter of this paragraph characterizes example 14 of the present disclosure, wherein example 14 also includes the subject matter according to any one of examples 12-13, above.

The flap comprises an auxiliary flap hinge about which the flap is rotatable. The track arm of the auxiliary support system further comprises a spherical bearing. The track arm is attached to the auxiliary flap hinge of the flap by the spherical bearing. The preceding subject matter of this paragraph characterizes example 15 of the present disclosure, wherein example 15 also includes the subject matter according to any one of examples 12-14, above.

The aircraft further comprises an actuation system coupled to the wing and the flap. The actuation system is spaced apart from the auxiliary support system in a spanwise direction along the wing. The actuation system is selectively operable to extend the flap from the wing along the extension path and retract the flap toward the wing along the extension path. The preceding subject matter of this paragraph characterizes example 16 of the present disclosure, wherein example 16 also includes the subject matter according to any one of examples 12-15, above.

The flap comprises an inboard end and an outboard end opposite the inboard end. The flap extends in the spanwise direction from the inboard end to the outboard end. The actuation system is coupled to the flap at a location between the inboard end and the outboard end. The aircraft further comprises two auxiliary support systems. The track arm of each of the two auxiliary support systems is attached to a corresponding one of the inboard end and the outboard end of the flap. The preceding subject matter of this paragraph characterizes example 17 of the present disclosure, wherein example 17 also includes the subject matter according to example 16, above.

Additionally described herein is a flap actuation assembly for actuating a flap relative to a wing of an aircraft. The flap actuation assembly comprises an actuation system coupleable to the wing and the flap, wherein the actuation system is selectively operable to extend the flap from the wing along an extension path and retract the flap toward the wing along the extension path. The flap actuation assembly also comprises an auxiliary support system. The auxiliary support system comprises a base fixable relative to the wing, a first track engagement assembly fixed to the base, a second track engagement assembly fixed to the base, and a track arm attached to the flap. The track arm comprises a first rail, movably engaged with the first track engagement assembly, and a second rail, movably engaged with the second track engagement assembly. A distance between the first rail and the second rail varies along a length of the track arm. The preceding subject matter of this paragraph characterizes example 18 of the present disclosure.

The wing comprises an outer upper surface and an outer lower surface. The outer upper surface and the outer lower surface define a loft profile of the wing. The track arm is configured to move along the extension path with the flap. An entirety of the auxiliary support system is configured to fit within the loft profile of the wing as the track arm moves along the extension path. The preceding subject matter of this paragraph characterizes example 19 of the present disclosure, wherein example 19 also includes the subject matter according to example 18, above.

The actuation system is spatially separate from the auxiliary support system. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
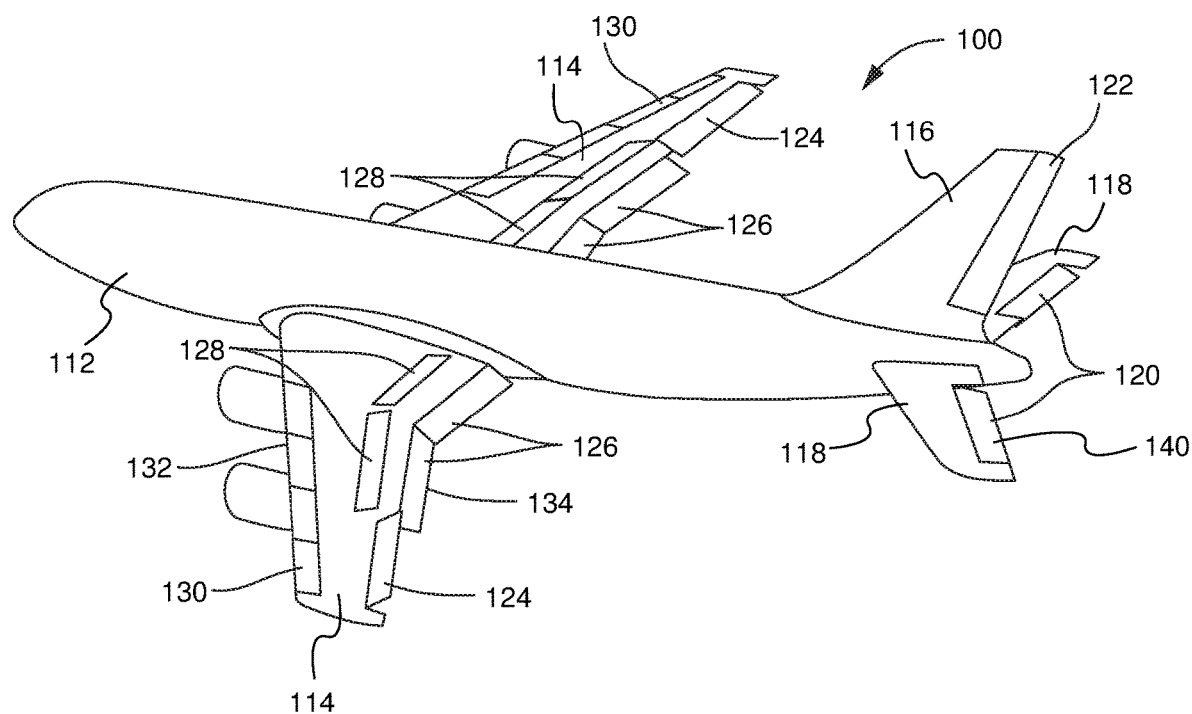
FIG. 1 is a perspective view of an aircraft, according to one or more examples of the present disclosure.

Referring to FIG. 1, one embodiment of an aircraft 100 is shown. The aircraft 100 can be any of various types of aircraft, such as commercial aircraft used for the transportation of passengers, military aircraft for military operations, personal aircraft, and the like. As depicted, the aircraft 100 represents a passenger airplane. The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 116 and/or the vertical stabilizer 116.

Figure 6:
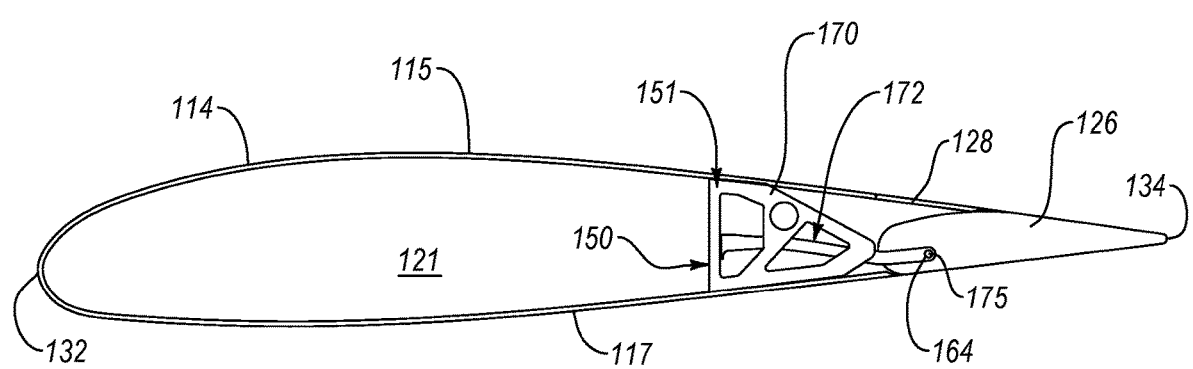
FIG. 6 is a cross-sectional side view of a wing, flap, and auxiliary support system of an aircraft, according to one or more examples of the present disclosure.
Figure 7:
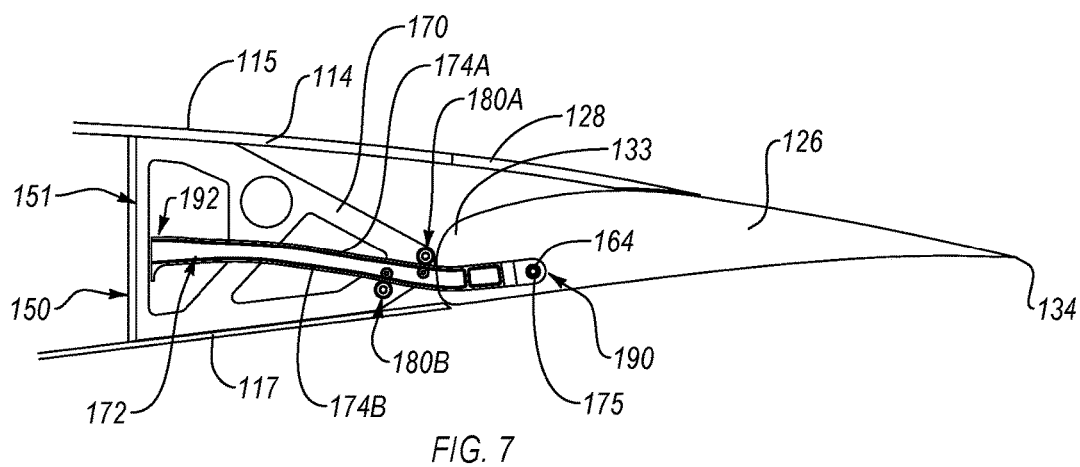
FIG. 7 is a cross-sectional side view of a flap and auxiliary support system, with the flap in a retracted position, according to one or more examples of the present disclosure.
Figure 8:
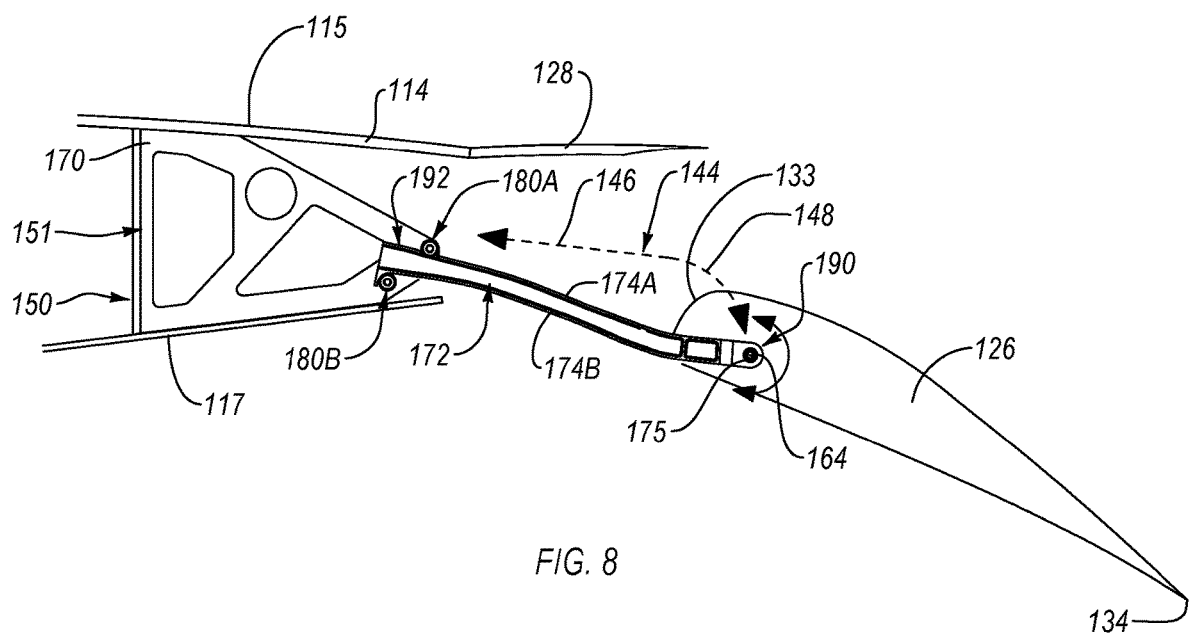
FIG. 8 is a cross-sectional side view of the flap and auxiliary support system of FIG. 7, with the flap in an extended position, according to one or more examples of the present disclosure.
Figure 9:
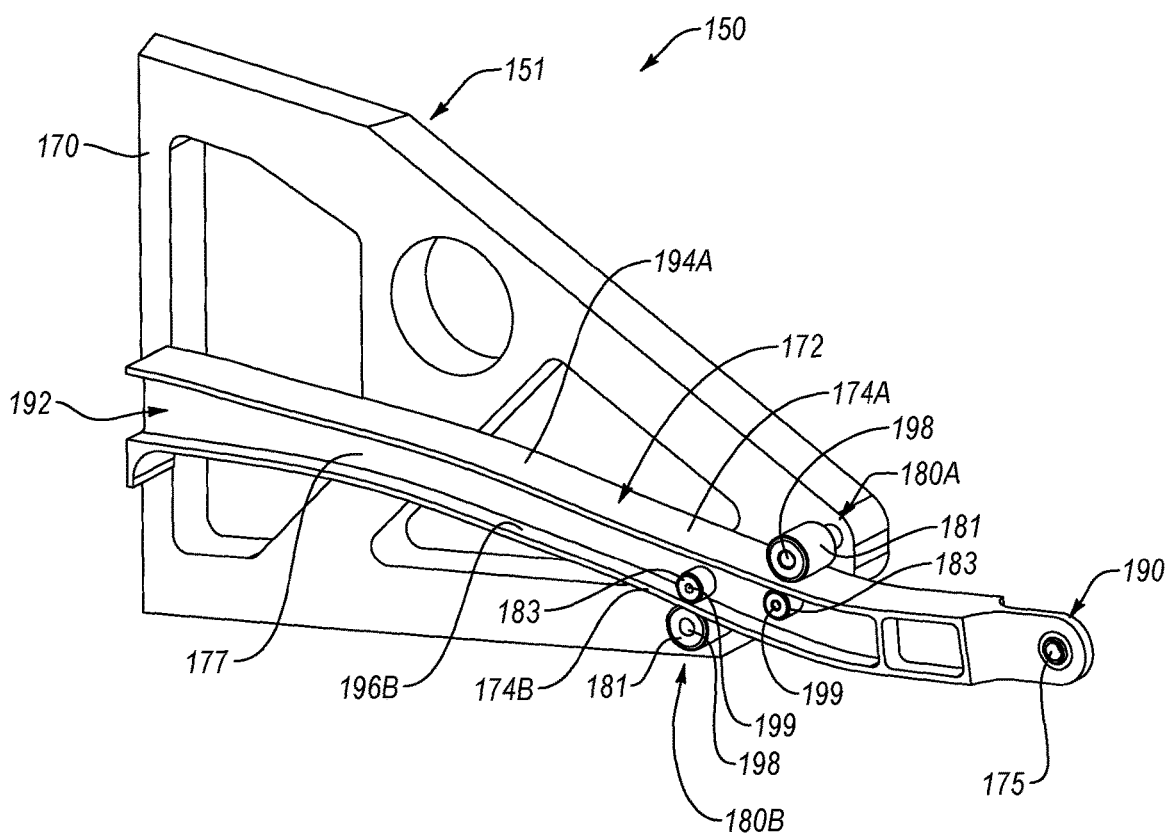
FIG. 9 is a perspective view of an auxiliary support system for a flap, according to one or more examples of the present disclosure.

Referring to FIGS. 6-8, each wing 114 includes an outer upper surface 115 and an outer lower surface 117. The outer upper surface 115 is opposite the outer lower surface 117. Furthermore, the outer upper surface 115 and the outer lower surface 117 converge at a leading edge 132 of the wing 114. The outer upper surface 115 and the outer lower surface 117 extend chordwise away from the leading edge 132 and terminate at trailing locations. Each wing 114 includes an interior cavity 121 defined between the outer upper surface 115 and the outer lower surface 117. Although not shown, the wing 114 may include internal structures, such as stringers, spars, and ribs, within the interior cavity 121 that rigidify and maintain the shape of the wing 114.

The aircraft 100 further includes a plurality of adjustable elements, which can be adjustable aerodynamic surfaces that are adjustable to change the characteristics of air flow over, around, and trailing the surfaces. For example, each wing 114, has coupled thereto, an aileron 124, flaps 126, spoilers 128, and slats 130. Additionally, the vertical stabilizer 116 includes a rudder 122, and each horizontal stabilizer 118 includes an elevator 120. For responsive control of the flight of the aircraft 100, the relative position of the adjustable aerodynamic surfaces of the aircraft, such as those shown in FIG. 1, should be capable of precise adjustment.

Figure 2:
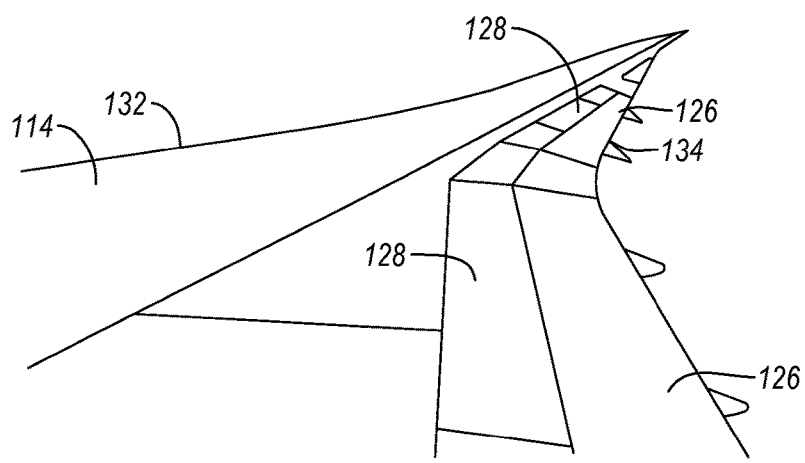
FIG. 2 is a perspective view of a wing of an aircraft, with flaps in a retracted position, according to one or more examples of the present disclosure.
Figure 3:
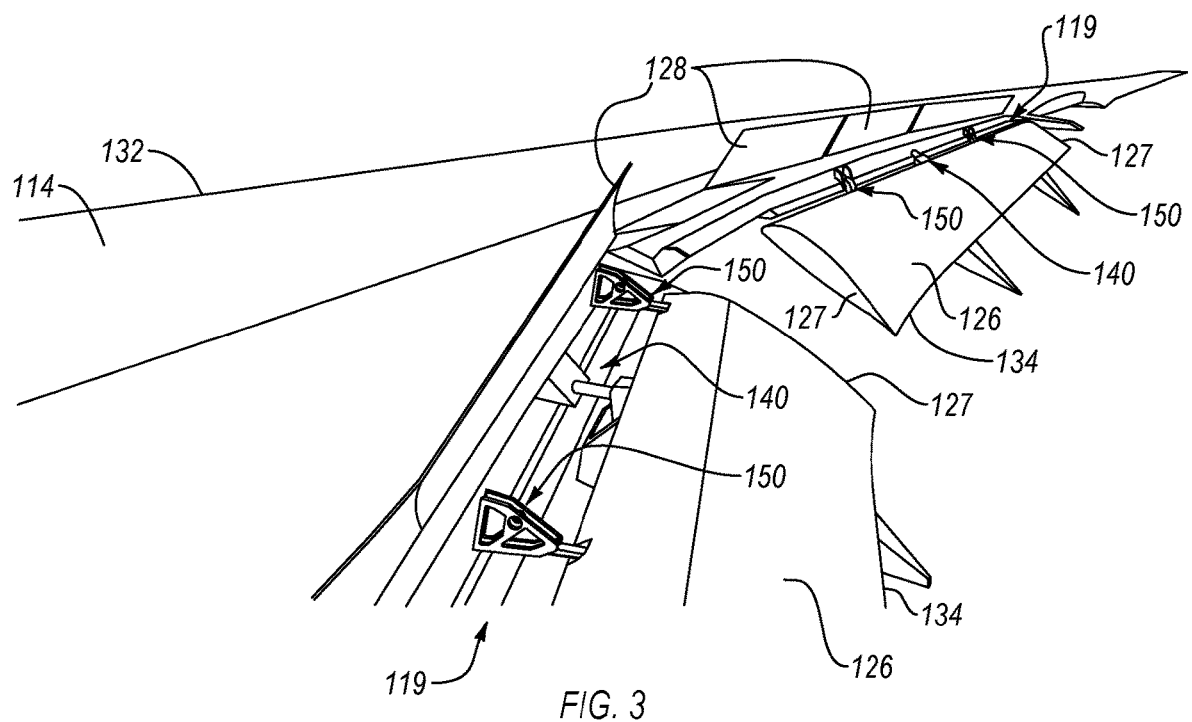
FIG. 3 is a perspective view of the wing of FIG. 2, with the flaps in an extended position, according to one or more examples of the present disclosure.

The flaps 126 are coupled to the wings 114 and selectively actuatable relative to the wings 114 to promote desired flight characteristics of the aircraft 100. In particular, each flap 126 is extendable away from a corresponding wing 114 into an extended position and retractable towards the corresponding wing 114 into a retracted position. In the retracted position (e.g., flap-up position), such as shown in FIGS. 2 and 7, a combined camber of the wing 114 and flap 126 is at a minimum, which reduces lift and drag. Accordingly, the flaps 126 are typically in the retracted position while the aircraft 100 is cruising at altitude. In the extended position (e.g., flap-down position), such as shown in FIGS. 2 and 8, the combined camber of the wing 114 and flap 126 is at some camber greater than the minimum (e.g., at a maximum), which increases lift and drag. Accordingly, the flaps 126 are typically in the retracted position while the aircraft 100 is flying at lower speeds, such as during approaches, take-offs, and landings. To further increase lift and reduce drag, the spoilers 128 can be raised as shown in FIG. 3.

Each flap 126 includes an inboard end 127 and an outboard end 129. The outboard end 129 is opposite the inboard end 127. In some implementations, the flap 126 is a long, thin structure with an aerodynamic profile. For example, the flap 126 can be elongated in a lengthwise direction extending from the inboard end 127 to the outboard end 129. The cross-sectional shape or aerodynamic profile of the flap 126 is based on the cross-sectional shape or aerodynamic profile of the wing 114. Generally, the flap 126 functions as a chordwise extension of the wing 114. More specifically, the wing 114 includes a flap slot within which the flap 126 is stored in the retracted position. The profile of the flap 126 is configured such that in the retracted position, the outer surfaces of the flap 126 are substantially flush with the outer surfaces of the wing 114. In particular, when retracted, the flap 126 abuts the trailing end of the outer lower surface 117 of the wing 114 to form a near seamless transition between the outer lower surface 117 and the flap 126. Similarly, with the flap 126 retracted and the spoiler 128 lowered, the flap 126 abuts the spoiler 128, which is hingedly coupled to the trailing end of the outer upper surface 115 to form a near seamless transition between the outer upper surface 117, the spoiler 128, and the flap 126. Accordingly, as shown in FIG. 2, when the flap 126 is in the retracted position and the spoilers 128 are lowered, the combined cross-sectional profile of the wing 114, the spoiler 128, and the flap 126 define a conventional airfoil shape. In this manner, as shown in FIG. 6, a trailing edge 134 of the flap 126 in effect acts as the trailing edge of the wing 114, opposite the leading edge 132 of the wing 114.

The portion of the conventional airfoil shape defined by the wing 114 is defined as a loft profile of the wing 114. The outer upper surface 115 and the outer lower surface 117 of the wing 114 define the loft profile of the wing 114. Moreover, the loft profile of the wing 114 ends at the trailing edges of the outer upper surface 115 and the outer lower surface 117. Accordingly, the loft profile of the wing 114 does not include the surfaces of fairings, bumps, blisters, sensors, and other extraneous structures that may be attached to or formed onto the outer upper surface 115 and the outer lower surface 117. In other words, the loft profile of the wing 114 is defined by just the smooth, gradually-curved, skin of the outer upper surface 115 and the outer lower surface 117. Any non-smooth or non-gradually curved surfaces (such as those associated with fairings, bumps, blisters, sensors, and the like) interrupting the smooth, gradually-curved, loft profile of the wing 114 that are added onto the outer upper surface 115 and the outer lower surface 117 may negatively affect the performance and/or control of the aircraft 100 by inducing drag and other aerodynamic effects. Accordingly, to improve performance and control of the aircraft 100, use of extraneous structures that interrupt the smooth, gradually-curved loft profile of the wing 114 should be limited.

The flap 126 includes a primary flap hinge 176 about which the flap 126 is rotatable. The primary flap hinge 176 defines a primary rotational axis about which the flap 126 rotates when the flap 126 is actuated by an actuation system 140, as described below. In some implementations, the primary flap hinge 176 is a continuous rod or pin, or co-axially aligned rod or pin segments, fixed to a leading edge 133 of the flap 126. The leading edge 133 of the flap 126 is opposite the trailing edge 134 of the flap 126. The primary flap hinge 176 can be supported by a mounting bracket 162 fixed to the flap 126. The primary flap hinge 176 extends through aligned apertures in the mounting bracket 162 and an actuation arm of the actuation system 140 to rotatably couple together the flap 126 and the wing 114 at the primary flap hinge 176.

Figure 4:
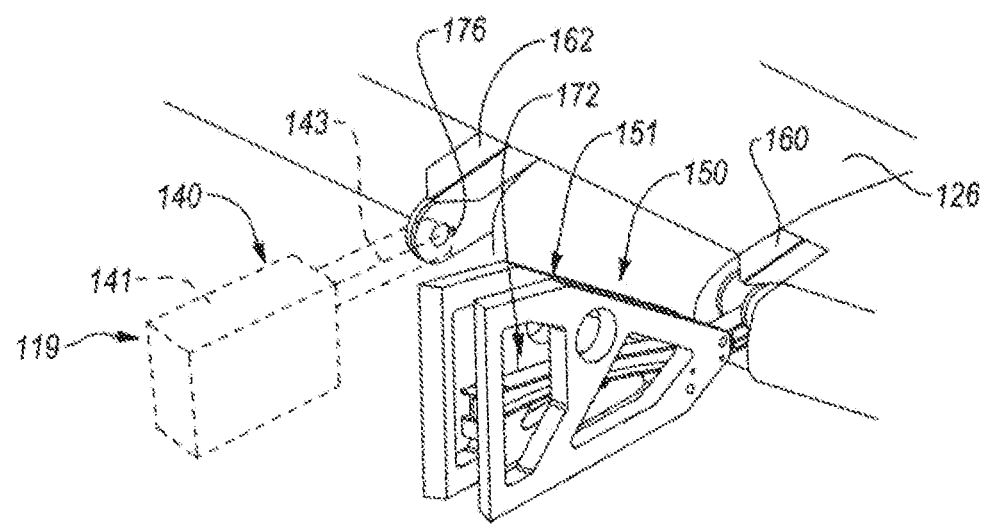
FIG. 4 is a perspective view of a flap actuation assembly of an aircraft, with a flap in a retracted position, according to one or more examples of the present disclosure.
Figure 5:
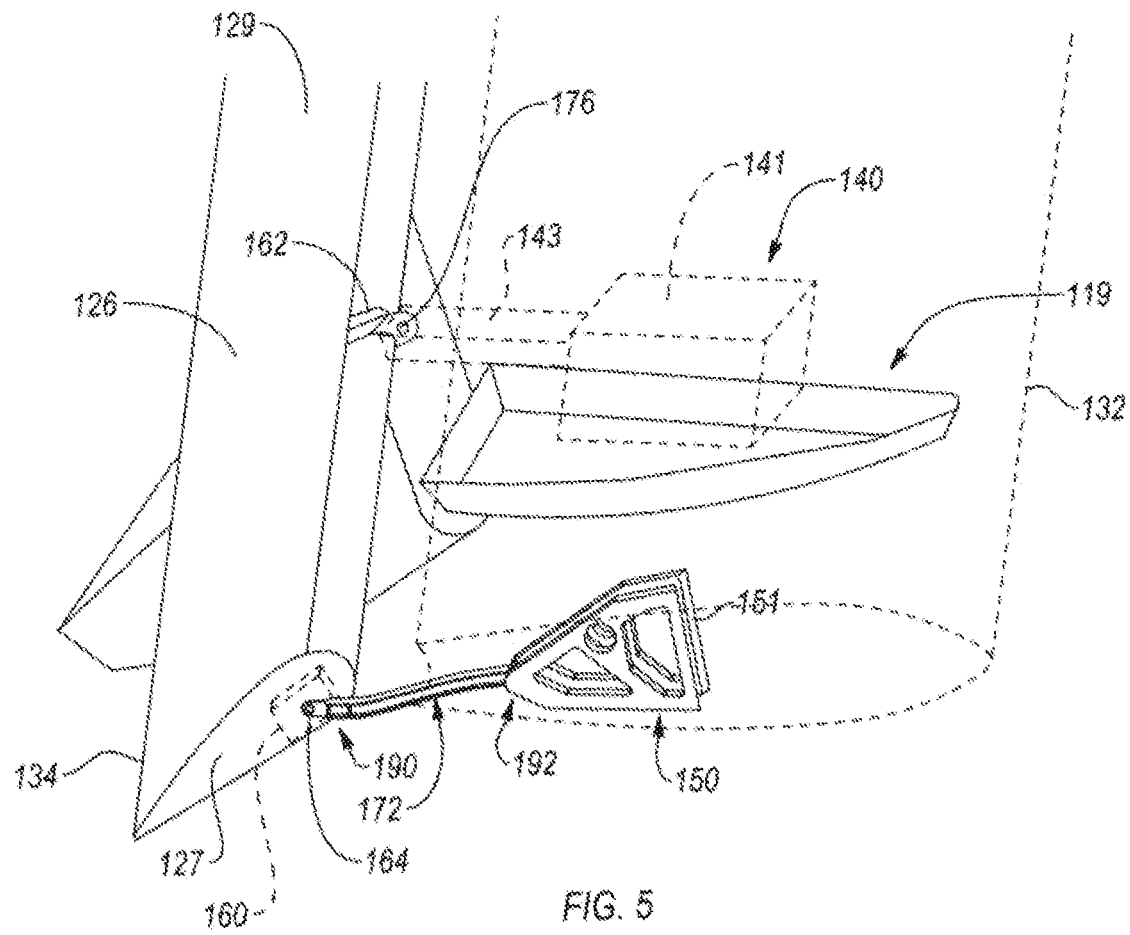
FIG. 5 is a perspective view of the flap actuation assembly of FIG. 4, with the flap in an extended position, according to one or more examples of the present disclosure.

Referring to FIGS. 3-5, the aircraft 100 further includes a flap actuation assembly 119 that is configured to actuate a flap 126 relative to the wing 114 to which the flap 126 is coupled. The flap actuation assembly 119 includes at least one actuation system 140 and at least one auxiliary support system 150. In general, the actuation system 140 initiates and drives actuation of the flap 126 relative to the wing 114 and the auxiliary support system 150 mechanically supports the flap 126 at an auxiliary location of the flap 126 as the flap 126 is actuated. The auxiliary location of the flap 126 is a location on the flap 126 adjacently spaced apart from the actuation system 140. For example, the actuation system 140 is spaced apart from the auxiliary support system 150 in a spanwise direction along the wing 114.

The actuation system 140 is selectively operable to extend the flap 126 from the wing 114 along an extension path 144 and retract the flap 126 toward the wing 114 along the extension path 144 (see, e.g., FIG. 8). The actuation system 140 includes at least one actuator 141 and various interconnected linkages 143 configured to move the flap 126 along the extension path 144 as the actuator 141 is actuated. The actuator 141 can be any of various actuators, such as hydraulic-powered or pneumatic-powered linear actuators and/or electric motors.

The extension path 144 represents the translational movement of the primary flap hinge 176 of the flap 126 as the actuator 141 is actuated. Accordingly, the linkages 143 are configured to move the primary flap hinge 176, and thus the entire leading edge 133 of the flap 126, along the extension path 144 as actuator 141 is actuated. The actuator 141 is actuated in a first manner (e.g., extended) to extend the primary flap hinge 176 from a retracted position (see, e.g., FIG. 7) along the extension path 144 away from the wing 114 in an extension direction to the extended position (see, e.g., FIG. 8). Similarly, the actuator 141 is actuated in a second manner (e.g., retracted to extend the primary flap hinge 176 from the extended position along the extension path 144 toward the wing 114 in a retraction direction, opposite the extension direction, to the retracted position. Referring to FIG. 8, in one implementation, the extension path 144 includes a linear portion 146 (e.g., Fowler motion) and a curved portion 148 (e.g., camber motion).

In some implementations, the linkages 143 are further configured to rotate the flap 126 about the primary flap hinge 176 as the primary flap hinge 176 translationally moves along the extension path 144. In this manner, the flap 126 may experience translational movement and rotational movement as the flap 126 is extended and retracted by the actuation system 140. In one implementation, the flap 126 does not rotate about the primary flap hinge 176 as the primary flap hinge 176 moves along the linear portion 146 of the extension path 144 and rotates about the primary flap hinge 176 as the primary flap hinge 176 moves along the curved portion 148 of the extension path 144.

Because the flaps 126 are long and thin in some embodiments, when extended, the flaps 126 can be susceptible to bending or deflection under the loads experienced during flight, particularly at the inboard end 127 and the outboard end 129 of the flap 126 (e.g., locations furthest away from the actuation system 140). When the flaps 126 are extended during flight, bending of the flaps 126 may negatively affect the performance and control of the aircraft 100. To promote performance and control of the aircraft 100, the motion of a flap 126 at all locations along the flap 126 are desirably the same and localized deflection of the flap 126 should be reduced. In particular, all locations along the flap 126 desirably experience the same motion along the extension path 144. The auxiliary location(s) of the flap 126 at which an auxiliary support system 150 is coupled to the flap 126 can be a location where the flap 126 is susceptible to bending and deflection. For example, the auxiliary locations of the flap 126 may include the inboard end 127 and the outboard end 129 of the flap 126. For particularly long flaps 126, one or more additional auxiliary locations can be located between the actuation system 140 and one or both of the inboard end 127 and the outboard end 126. In some embodiments, one auxiliary support system 150 is coupled to the flap 126 at each of the designated auxiliary locations of the flap 126.

Generally, the auxiliary support system 150 is configured to limit deflection and bending of the flaps 126 when extended, and while extending and retracting, during flight at the auxiliary location of the flap 126 to which the auxiliary support system 150 is coupled. Referring to FIGS. 4-12, according to one embodiment, the auxiliary support system 150 (e.g., each auxiliary support system 150 of multiple auxiliary support systems 150 coupled to a single flap 126) includes a base 151, a first track engagement assembly 180A, a second track engagement assembly 180B, and a track arm 172.

The base 151 is non-movably fixed to the wing 114. In other words, the base 151 of the auxiliary support system 150 does not move relative to the wing 114. As shown in FIGS. 7 and 8, the base 151 is located within the interior cavity 121 of the wing 114. The base 151 can be fixedly secured to any of various internal structures of the wing 114, such as, but not limited to, interior surfaces of the skin of the wing 114, spars, stringers, ribs, and the like. The base 151 is sized so as to fit within the loft profile of the wing 114. In other words, no portion of the base 151 extends beyond or protrudes outside of the loft profile of the wing 114. In the illustrated implementation, the base 151 includes two plates 170 in a spaced-apart arrangement. In other words, the two plates 170 of the base 151 are spaced apart from each other such that a space or gap is defined between the two plates 170. The plates 170 may have an outer peripheral shape that at least partially complements a cross-sectional shape of the interior cavity 121 of the wing 114. In one example, the plates 170 are trapezoidal, triangular, or wedge shaped. The plates 170 may include apertures or cut-outs for weight-reduction purposes and may be made of any of various materials, such as steel, aluminum, fiber-reinforced composite, and the like.

The first track engagement assembly 180A and the second track engagement assembly 180B are fixed to the base 151. In the illustrated embodiment, the first track engagement assembly 180A and the second track engagement assembly 180B are interposed between the two plates 170 within the space defined between the two plates 170. The first track engagement assembly 180A is offset or spaced apart from the second track engagement assembly 180B. In the illustrated embodiment, the first track engagement assembly 180A is horizontally and vertically offset from the second track engagement assembly 180B. In some implementations, the horizontal offset is in a chordwise direction of the wing 114 and the vertical offset is in a wing thickness direction perpendicular to the chordwise direction and the spanwise direction of the wing 114. In one embodiment, the first track engagement assembly 180A and the second track engagement assembly 180B are at fixed locations relative to each other and relative to the base 151. However, in other embodiments, the locations of the base 151 to which the first track engagement assembly 180A and/or the second track engagement assembly 180B are fixed may be adjustable, such that the offset between the first track engagement assembly 180A and the second track engagement assembly 180B is adjustable. Adjustability of the locations of the first track engagement assembly 180A and/or the second track engagement assembly 180B relative to each other could be implemented with any of various mechanical or electromechanical devices for example.

Figure 12:
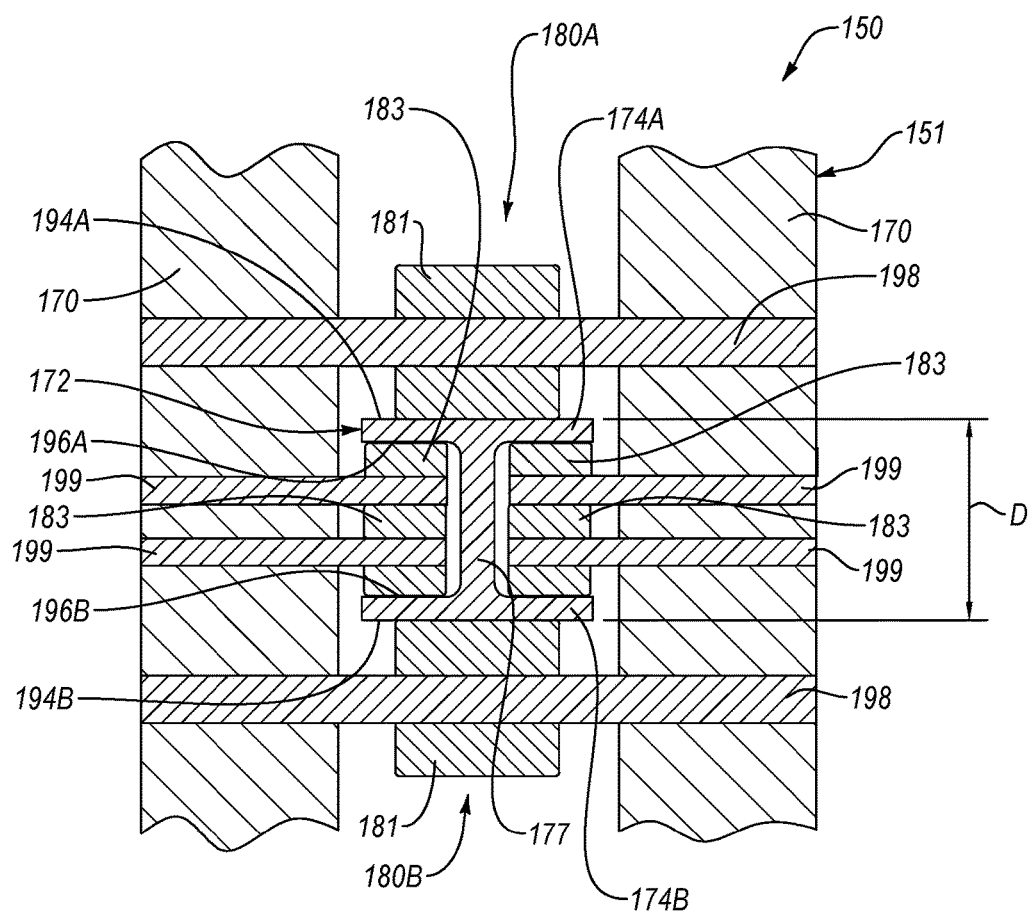
FIG. 12 is a cross-sectional rear view of an auxiliary support system for a flap, taken along a line analogous to the line 12-12 of FIG. 10, according to one or more examples of the present disclosure.

Referring to FIGS. 9-12, each of the first track engagement assembly 180A and the second track engagement assembly 180B comprises a first roller 181 and two second rollers 183. The first roller 181 is centered between the plates 170 and the second rollers 183 of each of the first track engagement assembly 180A and the second track engagement assembly 180B are off-centered between the plates 170. The first roller 181 of each of the first track engagement assembly 180A and the second track engagement assembly 180B is rotatably coupled to both of the plates 170 of the base 151. In one implementation, as shown in FIG. 12, the first roller 181 is rotatably coupled to the first track engagement assembly 180A and the second track engagement assembly 180B by a corresponding spindle 198. The spindles 198 are coupled to both the plates 170 and span an entirety of the gap between the plates 170. In some implementations, each spindle 198 includes two or more spindle segments, such as one spindle segment on each side of each first roller 181.

The two second rollers 183 of each of the first track engagement assembly 180A and the second track engagement assembly 180B are rotatably coupled to a corresponding one of the plates 170. In the implementation shown in FIG. 12, the each of the second rollers 183 is rotatably coupled to a corresponding one of first track engagement assembly 180A and the second track engagement assembly 180B by a corresponding spindle 199. Each of the spindles 199 span only a portion of the gap between the plates 170. The rollers 183 of each of the first track engagement assembly 180A and the second track engagement assembly 180B are coaxially aligned.

Each of the spindles 198 and the spindles 199 may include various features, such as rods, bearings, and the like, configured to facilitate relative rotation of the corresponding roller relative to the base 151. Each of the first rollers 181 and the second rollers 183 includes a cylinder configured to roll along a surface. In some implementations, one or more of the first rollers 181 and the second rollers 183 include a friction-inducing surface or material that reduces slippage between the rollers and a surface on which the rollers roll.

The track arm 172 of the auxiliary support system 150 is an elongated structure that extends lengthwise from a fixed end portion 190 to a free end portion 192. The free end portion 192, which includes a free end, is opposite the fixed end portion 190, which includes a fixed end. An intermediate portion of the track arm 172 is between the fixed end portion 190 and the free end portion 192. Referring to FIG. 5, the fixed end portion 190 is attached to the flap 126 at an auxiliary flap hinge 164 of the flap 126. The auxiliary flap hinge 164 defines an auxiliary rotational axis about which the flap 126 rotates when the flap 126 is actuated by the actuation system 140. The auxiliary flap hinge 164 can be coaxial with, or parallel to and offset from, the primary flap hinge 176. In some implementations, the auxiliary flap hinge 164 is a continuous rod or pin, or co-axially aligned rod or pin segments, fixed near the leading edge 133 of the flap 126. The auxiliary flap hinge 164 can be supported by a mounting bracket 160 fixed to an auxiliary location (e.g., one of the inboard end 127 or the outboard end 129 of the flap 126). The auxiliary flap hinge 164 extends through aligned apertures in the mounting bracket 160 and a spherical bearing 175 of the fixed end portion 190 of the track arm 172 to rotatably and swayably couple together the flap 126 and the track arm 172 at the auxiliary flap hinge 164.

The spherical bearing 175 is coupled to the fixed end portion 190, such as by press-fitting the spherical bearing 175 into an aperture formed in the fixed end portion 190. The spherical bearing 175 can be one of various types of spherical bearings (e.g., spherical ball bearings, spherical roller bearings, spherical plain bearings, and rod ends) with an element that is movably contained within a housing and rotatable about any two orthogonal axes relative to the housing. In other words, the spherical bearing 175 permits rotation about an axis at any of multiple angular orientations. Accordingly, when the flap 126 is coupled to the track arm 172 by the spherical bearing 175, the spherical bearing 175 facilitates rotational movement of the flap 126 relative to the track arm 172 and angular or swaying movement of the flap 126 relative to the track arm 172. In this manner, the spherical bearing 175 accommodates off-axis rotation of the flap 126 relative to the track arm 172, which reduces binding between the flap 126 and the track arm 172 as the flap 126 extends and retracts.

The track arm 172 further includes a first rail 174A and a second rail 174B. The first rail 174A is spaced apart from and non-parallel to the second rail 174B. Both the first rail 174A and the second rail 174B are elongated and extend along the track arm 172 in the lengthwise direction. The first rail 174A and the second rail 174B are spaced apart by a web 177 extending between and coupling together the first rail 174A and the second rail 174B. According to one implementation, the track arm 172 is configured as a non-linear I-beam where the first rail 174A is defined by the upper flanges of the I-beam and the second rail 174B is defined by the lower flanges of the I-beam. In other words, the track arm 172 can have a substantially I-shaped cross-section along a plane perpendicular to the length of the track arm 172, as shown in FIG. 12.

Figure 10:
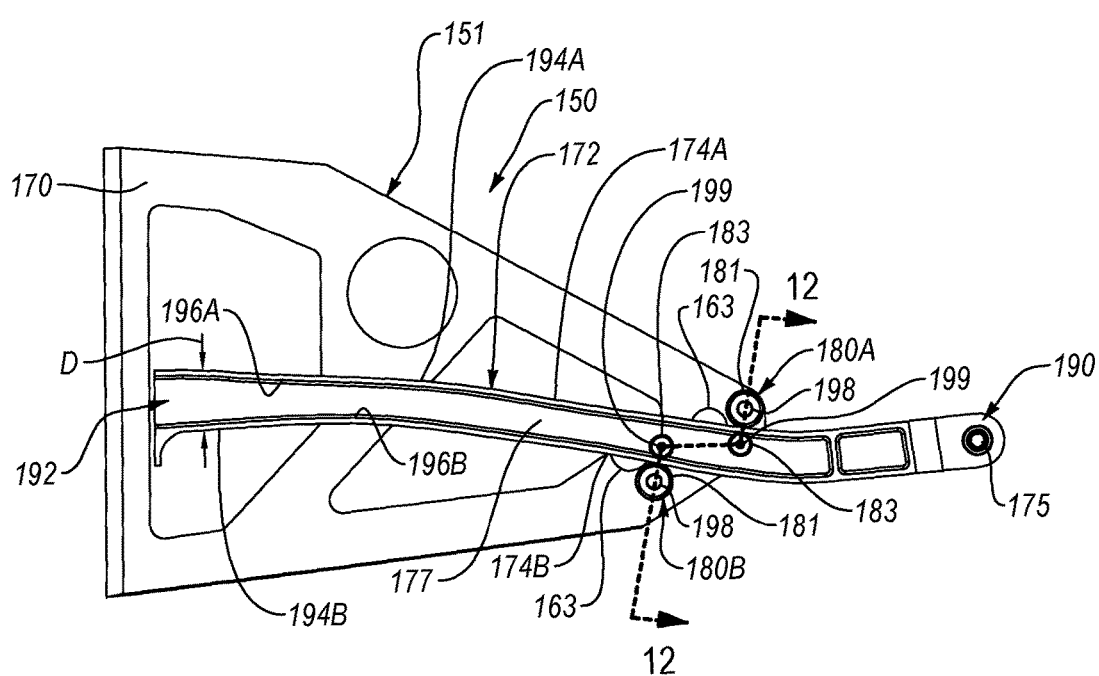
FIG. 10 is a side elevation view of the auxiliary support system of FIG. 9, according to one or more examples of the present disclosure.
Figure 11:
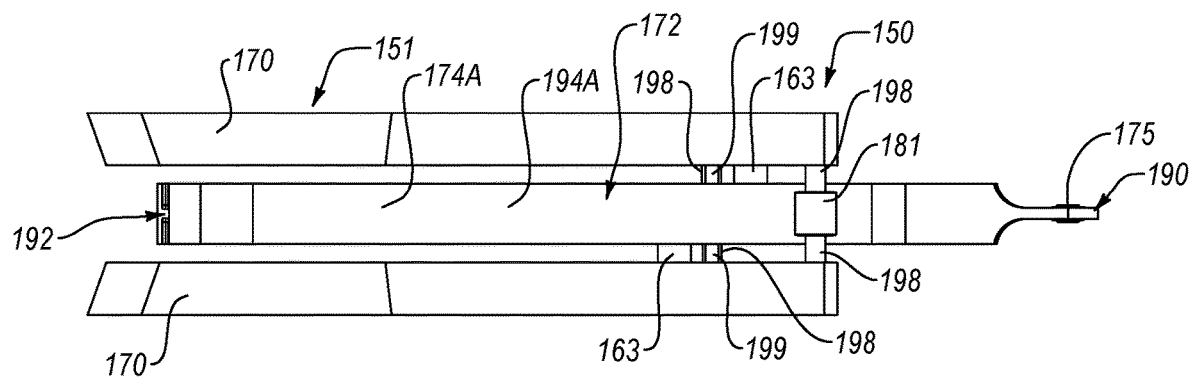
FIG. 11 is a top plan view of an auxiliary support system for a flap, according to one or more examples of the present disclosure.

Referring to FIG. 10, the first rail 174A is non-parallel to the second rail 174B because the distance D between the first rail 174A and the second rail 174B changes along at least some portion of the length of the track arm 172. In one implementation, the distance D is greater at the free end portion 192 than at the fixed end portion 190. In other words, the distance D increases (e.g., the first rail 174A and the second rail 174B diverge away from each other) along some portion of the length of the track arm 172 in a direction going from the fixed end portion 190 towards the free end portion 192. In some implementations, the distance D is constant along a portion of the length of the track arm 172 near the fixed end portion 190 and the distance D gradually increases, in a direction towards the free end portion 192 away from the fixed end portion 190, along a portion of the length of the track arm 172 near the free end portion 192. In yet some implementations, the distance D gradually increases, in a direction towards the free end portion 192 away from the fixed end portion 190, along the entire, or nearly the entire, length of the track arm 172.

According to one embodiment, the first rail 174A and the second rail 174B are non-linear. In other words, the first rail 174A and the second rail 174B have at least one curved portion. In the illustrated implementation, the first rail 174A and the second rail 174B each has a substantially S-shape. For example, a portion of the first rail 174A and the second rail 174B near the fixed end portion 190 may be curved in one direction (e.g., upwardly curved) and a portion of the first rail 174A and the second rail 174B near the free end portion 192 may be curved in an opposite direction (e.g., downwardly curved).

Each of the first rail 174A and the second rail 174B defines an outer surface and an inner surface. In particular, the first rail 174A includes an outer surface 194A and an inner surface 196A. The outer surface 194A is opposite, but parallel to, the inner surface 196A. In other words, a thickness of the first rail 174A is constant along the length of the first rail 174A. Also, the second rail 174B includes an outer surface 194B and an inner surface 196B. The outer surface 194B is opposite, but parallel to, the inner surface 196B. In other words, a thickness of the second rail 174B is constant along the length of the second rail 174B.

The track arm 172 is movably retained relative to the base 151 by engagement between the first rail 174A and the second rail 174B and the first track engagement assembly 180A and the second track engagement assembly 180B, respectively. The rollers of the first track engagement assembly 180A and the second track engagement assembly 180B roll along the outer surface and inner surface of the first rail 174A and second rail 174B, respectively. In particular, the first roller 181 of the first track engagement assembly 180A rolls along the outer surface 194A of the first rail 174A, the second rollers 183 of the first track engagement assembly 180A roll along the inner surface 196A of the first rail 174A, the first roller 181 of the second track engagement assembly 180B rolls along the outer surface 194B of the second rail 174B, the second rollers 183 of the second track engagement assembly 180B roll along the inner surface 196B of the second rail 174B. The first roller 181 and the second rollers 183 of the first track engagement assembly 180A are spatially positioned relative to each other such that the first rail 174A is, in effect, movably clamped and interposed between the first roller 181 and the second rollers 183 of the first track engagement assembly 180A. Similarly, the first roller 181 and the second rollers 183 of the second track engagement assembly 180B are spatially positioned relative to each other such that the second rail 174B is, in effect, movably clamped and interposed between the first roller 181 and the second rollers 183 of the second track engagement assembly 180B. The offset between and arm-engagement provided by the first track engagement assembly 180A and the second track engagement assembly 180B results in the track arm 172 being constrained, both horizontally and vertically, from disengagement with the base 151.

Referring to FIGS. 7 and 8, as the flap 126 is moved from the retracted position in FIG. 7 to the extended position in FIG. 8, the track arm 172, being attached to the flap 126, is drawn away from the wing 114 as shown. The rollers of the first track engagement assembly 180A and the second track engagement assembly 180B roll along the first rail 174A and the second rail 174B to help facilitate movement of the track arm 172 relative to the base 151. The offset of the first track engagement assembly 180A and the second track engagement assembly 180B, as well as the curved and diverging nature of the first rail 174A and the second rail 174B, results in the fixed end portion 190 of the track arm 172 moving along the extension path 144 of the flap 126. For example, engagement between the rollers of the first track engagement assembly 180A and the second track engagement assembly 180B and a first portion of the track arm 172 with non-diverging rails produces a substantially linear movement of the fixed end portion 190 along the linear portion 146 of the extension path 144. However, once the rollers reach a second portion of the track arm 172 with diverging rails, the engagement between the rollers and the rails produces a substantially curved movement of the fixed end portion 190 along the curved portion 148 of the extension path 144. While moving along the extension path 144, the flap 126 is rotated by the actuation system 140 which translates into rotation of the flap 126 about the auxiliary flap hinge 164. In a similar manner, engagement between the rollers and the track arm 172 results in the fixed end portion 190 of the track arm 172 following the extension path 144 back to the retracted position from the extended position.

The degree of curvature of the first rail 174A and the second rail 174B, the rate of divergence of the first rail 174A and the second rail 174B, and the location of divergence along the track arm 172 impact the shape of the path traveled by the fixed end portion 190 of the track arm 172. For example, increasing the rate of divergence results in a sharper radius of the curved portion 148 of the extension path 144. As another example, diverging the first rail 174A and the second rail 174B at a different location along the track arm 172 results in the curved portion 148 starting sooner or later in the extension path 144.

The diverging dual-rail configuration of the track arm 172 facilitates extension of the flap 126 and retraction of the flap 126 along the extension path 144 without any portion of the auxiliary support system 150 extending beyond the loft profile of the wing 114. Because no portion of the auxiliary support system 150 extends beyond the loft profile of the wing 114, a fairing, bump, or cover on the surface of the wing 115 is not needed to cover the auxiliary support system 150. In other words, unlike some conventional systems that support flaps, which require on-wing fairings, the auxiliary support system 150 is, in effect, a fairingless system or stated differently, the wing 114 is fairingless at the auxiliary support system 150.

In some implementations, the auxiliary support system 150 further includes at least one rub pad 163 interposed between at least one of the plates 170 and the track arm 172.

In the illustrated implementation, one rub pad 163 is interposed between one of the plates 170 and the track arm 172 and one rub pad 163 is interposed between the other of the plates 170 and the track arm 172. In certain operating conditions, the flap 126 may move laterally in a spanwise direction relative to the wing 114. Such movement may cause the track arm 172 to also move in the same lateral direction. If the track arm 172 moves laterally, the rub pads 163 are configured to contact the track arm 172 before the track arm 172 can contact the plates 170. Accordingly, the rub pads 163 prevent the track arm 172 from contacting or rubbing against the plates 170. In some implementations, the rub pads 163 are made of a resilient and/or elastic material, such as a polymeric material. The rub pads 163 can be more easily replaced if worn down compared to the track arm 172 and plates 170.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An auxiliary support system for a flap coupled to a wing of an aircraft, the auxiliary support system comprising:
   a base fixable relative to the wing;
   a first track engagement assembly fixed to the base;
   a second track engagement assembly fixed to the base; and
   a track arm attachable to the flap and comprising a first rail, directly movably engaged with the first track engagement assembly, and a second rail, directly movably engaged with the second track engagement assembly, wherein the first rail is spaced apart from and non-parallel to the second rail, wherein:
      the track arm comprises a free end portion and a fixed end portion;
      the free end portion is opposite the fixed end portion;
      the fixed end portion is attachable to the flap; and
      the first rail and the second rail diverge away from the fixed end portion such that a distance between an inner surface of the first rail and an inner surface of the second rail is greater at the free end portion than at the fixed end portion.

2. The auxiliary support system according to claim 1, wherein the first rail and the second rail are non-linear.

3. The auxiliary support system according to claim 1, wherein:
   the first rail of the track arm is slidably engaged with the first track engagement assembly;
   the second rail of the track arm is slidably engaged with the second track engagement assembly; and
   slidable engagement between the first rail and the first track engagement assembly and between the second rail and the second track engagement assembly keeps the fixed end portion of the track arm within an extension path comprising a linear portion and a curved portion.

4. The auxiliary support system according to claim 1, wherein each of the first rail and the second rail has a substantially S-shape.

5. The auxiliary support system according to claim 1, wherein:
the track arm comprises a free end portion and a fixed end portion;
the free end portion is opposite the fixed end portion;
the fixed end portion is attachable to the flap;
the fixed end portion of the track arm comprises a spherical bearing; and
the track arm is attachable to the flap via the spherical bearing.

6. The auxiliary support system according to claim 1, wherein the first track engagement assembly is horizontally and vertically offset from the second track engagement assembly.

7. The auxiliary support system according to claim 1, wherein:
each of the first track engagement assembly and the second track engagement assembly comprises a first roller and a second roller;
the first rail of the track arm is interposed between the first roller and the second roller of the first track engagement assembly, wherein the first roller and the second roller of the first track engagement assembly are rollable along the first rail; and
the second rail of the track arm is interposed between the first roller and the second roller of the second track engagement assembly, wherein the first roller and the second roller of the second track engagement assembly are rollable along the second rail.

8. The auxiliary support system according to claim 1, wherein:
the base comprises two plates spaced-apart from each other; and
the track arm is interposed and movable between the two plates.

9. The auxiliary support system according to claim 8, further comprising at least one rub pad interposed between one of the two plates and the track arm and at least one rub pad interposed between the other of the two plates and the track arm.

10. An aircraft, comprising:
a body;
a wing coupled to and extending from the body, wherein the wing comprises an outer upper surface and an outer lower surface, the outer upper surface and the outer lower surface defining a loft profile of the wing;
a flap coupled to the wing and extendable from the wing along an extension path comprising a linear portion and a curved portion; and
an auxiliary support system comprising:
a base fixed to the wing within the loft profile of the wing;
a first track engagement assembly fixed to the base;
a second track engagement assembly fixed to the base; and
a track arm attached to the flap and comprising a first rail, directly movably engaged with the first track engagement assembly, and a second rail, directly movably engaged with the second track engagement assembly, wherein the track arm moves along the extension path with the flap and remains within the loft profile of the wing as the flap extends from the wing, wherein:
the track arm comprises a free end portion and a fixed end portion;
the free end portion is opposite the fixed end portion;
the fixed end portion is attachable to the flap; and
the first rail and the second rail diverge away from the fixed end portion such that a distance between an inner surface of the first rail and an inner surface of the second rail is greater at the free end portion than at the fixed end portion.

11. The aircraft according to claim 10, wherein the first rail is spaced apart from and non-parallel to the second rail.

12. The aircraft according to claim 10, wherein the wing is fairingless at the auxiliary support system.

13. The aircraft according to claim 10, wherein:
the flap comprises an auxiliary flap hinge about which the flap is rotatable;
the track arm of the auxiliary support system further comprises a spherical bearing; and
the track arm is attached to the auxiliary flap hinge of the flap by the spherical bearing.

14. The aircraft according to claim 10, further comprising an actuation system coupled to the wing and the flap, wherein:
the actuation system is spaced apart from the auxiliary support system in a spanwise direction along the wing; and
the actuation system is selectively operable to extend the flap from the wing along the extension path and retract the flap toward the wing along the extension path.

15. The aircraft according to claim 14, wherein:
the flap comprises an inboard end and an outboard end opposite the inboard end;
the flap extends in the spanwise direction from the inboard end to the outboard end;
the actuation system is coupled to the flap at a location between the inboard end and the outboard end;
the aircraft further comprises two auxiliary support systems;
the track arm of each of the two auxiliary support systems is attached to a corresponding one of the inboard end and the outboard end of the flap.

16. The aircraft according to claim 10, wherein:
the first rail of the track arm is slidably engaged with the first track engagement assembly;
the second rail of the track arm is slidably engaged with the second track engagement assembly; and
slidable engagement between the first rail and the first track engagement assembly and between the second rail and the second track engagement assembly keeps the fixed end portion of the track arm within an extension path comprising a linear portion and a curved portion.

17. A flap actuation assembly for actuating a flap relative to a wing of an aircraft, the flap actuation assembly comprising:
an actuation system coupleable to the wing and the flap, wherein the actuation system is selectively operable to extend the flap from the wing along an extension path and retract the flap toward the wing along the extension path; and
an auxiliary support system comprising:
a base fixable relative to the wing;
a first track engagement assembly fixed to the base;
a second track engagement assembly fixed to the base; and
a track arm attached to the flap and comprising a first rail, directly movably engaged with the first track engagement assembly, and a second rail, directly movably engaged with the second track engagement assembly, wherein a distance between the first rail and the second rail varies along a length of the track arm, wherein:

the track arm comprises a free end portion and a fixed end portion;

the free end portion is opposite the fixed end portion;

the fixed end portion is attachable to the flap; and the first rail and the second rail diverge away from the fixed end portion such that a distance between an inner surface of the first rail and an inner surface of the second rail is greater at the free end portion than at the fixed end portion.

18. The flap actuation assembly according to claim 17, wherein:

the wing comprises an outer upper surface and an outer lower surface;

the outer upper surface and the outer lower surface define a loft profile of the wing;

the track arm is configured to move along the extension path with the flap; and an entirety of the auxiliary support system is configured to fit within the loft profile of the wing as the track arm moves along the extension path.

19. The flap actuation assembly according to claim 17, wherein the actuation system is spatially separate from the auxiliary support system.

20. The flap actuation assembly according to claim 17, wherein:

the first rail of the track arm is slidably engaged with the first track engagement assembly;

the second rail of the track arm is slidably engaged with the second track engagement assembly; and slidable engagement between the first rail and the first track engagement assembly and between the second rail and the second track engagement assembly keeps the fixed end portion of the track arm within an extension path comprising a linear portion and a curved portion.

* * * * *